(12) United States Patent
Jiang et al.

(10) Patent No.: US 11,967,843 B2
(45) Date of Patent: Apr. 23, 2024

(54) BATTERY PROTECTION CIRCUIT AND LITHIUM BATTERY SYSTEM

(71) Applicant: Suzhou XySemi Electronic Technology Co., Limited, Jiangsu (CN)

(72) Inventors: Jinmao Jiang, Jiangsu (CN); Jian Tan, Jiangsu (CN)

(73) Assignee: SUZHOU XYSEMI ELECTRONIC TECHNOLOGY CO., LIMITED (CN)

( * ) Notice: Subject to any disclaimer, the term of this patent is extended or adjusted under 35 U.S.C. 154(b) by 415 days.

(21) Appl. No.: 17/441,387

(22) PCT Filed: Jun. 29, 2021

(86) PCT No.: PCT/CN2021/103125
§ 371 (c)(1),
(2) Date: Sep. 21, 2021

(87) PCT Pub. No.: WO2022/062532
PCT Pub. Date: Mar. 31, 2022

(65) Prior Publication Data
US 2022/0352731 A1 Nov. 3, 2022

(30) Foreign Application Priority Data

Sep. 24, 2020 (CN) .......................... 202011014914.5

(51) Int. Cl.
*H02J 7/00* (2006.01)
(52) U.S. Cl.
CPC .................................. *H02J 7/0034* (2013.01)
(58) Field of Classification Search
CPC .................................................. H02J 7/0034
(Continued)

(56) References Cited

U.S. PATENT DOCUMENTS

| 6,628,489 B1 * | 9/2003 | Pardoen | H02J 7/0034 361/84 |
| 8,654,549 B2 * | 2/2014 | Janning | H02J 7/0034 363/63 |

(Continued)

FOREIGN PATENT DOCUMENTS

| CN | 102904218 | 1/2013 |
| CN | 105071469 | 11/2015 |

(Continued)

OTHER PUBLICATIONS

State Intellectual Property Office of People's Republic of China, Notification of Search Report for Application No. 2020110149145, China.

(Continued)

*Primary Examiner* — Yalkew Fantu
(74) *Attorney, Agent, or Firm* — McDonald Hopkins LLC

(57) ABSTRACT

Provided are a battery protection circuit and a lithium battery system. The battery protection circuit includes a switch circuit, a drive control circuit, a reverse connection protection circuit and a power supply circuit. A first input terminal of the reverse connection protection circuit is connected to an output terminal of the power supply circuit. An output terminal of the reverse connection protection circuit is connected to a second input terminal of the drive control circuit. The reverse connection protection circuit is configured to output a reverse connection control signal when the battery is reversely connected to a charger. The drive control circuit is configured to control, according to the reverse connection control signal, the switch circuit to turn off.

9 Claims, 8 Drawing Sheets

(58) Field of Classification Search
USPC .......................................................... 320/165
See application file for complete search history.

(56) References Cited

U.S. PATENT DOCUMENTS

| 2013/0026995 | A1* | 1/2013 | Kitajima | ............. | H01M 10/425 |
|---|---|---|---|---|---|
| | | | | | 320/134 |
| 2017/0244239 | A1* | 8/2017 | Jin | ........................ | H02J 7/0029 |
| 2019/0115774 | A1* | 4/2019 | Li | ........................ | H02J 7/0031 |

FOREIGN PATENT DOCUMENTS

| CN | 107785966 | 3/2018 |
|---|---|---|
| CN | 108110868 | 6/2018 |
| CN | 111313509 | 6/2020 |
| CN | 111934401 | 11/2020 |

OTHER PUBLICATIONS

State Intellectual Property Office of People's Republic of China, Notification of First Office Action for Application No. 2020110149145, report dated Nov. 19, 2020, China.
State Intellectual Property Office of People's Republic of China, Notification of Second Office Action for Application No. 2020110149145, report dated Dec. 16, 2020, China.

* cited by examiner

BATTERY PROTECTION CIRCUIT AND LITHIUM BATTERY SYSTEM

This application is a 35 U.S.C. 371 national stage filing of PCT Application No. PCT/CN2021/103125 fled on Jun. 29, 2021, which claims priority to Chinese Patent Application No. 202011014914.5 filed with CNIPA on Sep. 24, 2020, the disclosures of which are incorporated herein by reference in their entireties.

TECHNICAL FIELD

Embodiments of the present application relate to the field of battery technologies, for example, a battery protection circuit and a lithium battery system.

BACKGROUND

A lithium battery protection circuit plays a protective role in over-discharge voltage, over-charge voltage, charge over-current, discharge over-current and discharge short-circuit and other situations of a lithium battery. The super-long service life of the lithium battery cannot be separated from the protection of the lithium battery protection circuit.

However, a lithium battery protection chip used in the related art is easy to damage the battery protection circuit and the battery due to the frequently turn-off and turn-on of a switch element when a charger is reversely connected and removed.

SUMMARY

Embodiments of the present application provide a battery protection circuit and a lithium battery system so that when the battery is reversely connected to a charger or disconnected from the charger, the switch element remains off, but is not frequently turned off or on, so as to ensure the safety of the battery protection circuit.

In a first aspect, embodiments of the present application provide a battery protection circuit. The battery protection circuit is connected to a battery, and the battery comprises a cell, a second electrode and a first electrode connected to a first pole of the cell. The battery protection circuit includes a switch circuit, a drive control circuit, a reverse connection protection circuit and a power supply circuit. The drive control circuit includes a first input terminal, a second input terminal, a third input terminal, a fourth input terminal and an output terminal. The reverse connection protection circuit includes a first input terminal, a second input terminal, a third input terminal and an output terminal. The power supply circuit comprises a first input terminal, a second input terminal and an output terminal. The switch circuit is connected between a second pole of the cell and the second electrode. A first terminal of the power supply circuit is connected to the first pole of the cell. A second terminal of the power supply circuit is connected to the second pole of the cell. The third input terminal of the drive control circuit is connected to the second electrode. The fourth input terminal of the drive control circuit is connected to the second pole of the cell. The second input terminal of the reverse connection protection circuit is connected to the second electrode. The third input terminal of the reverse connection protection circuit is connected to the second pole of the cell. The first input terminal of the drive control circuit and the first input terminal of the reverse connection protection circuit are each connected to the output terminal of the power supply circuit. The output terminal of the drive control circuit is connected to the switch circuit. The drive control circuit is configured to turn on or off the switch circuit. The reverse connection protection circuit is configured according to one of the following methods: the output terminal of the reverse connection protection circuit is connected to the second input terminal of the drive control circuit, the reverse connection protection circuit is configured to respond to a reverse connection state between the battery and a charger and output reverse connection control signals, and the drive control circuit is configured to turn off the switch circuit according to the reverse connection control signals. Alternatively, the output terminal of the reverse connection protection circuit is connected to the switch circuit, and the reverse connection protection circuit is configured to respond to the reverse connection state, output the reverse connection control signals and turn off the switch circuit according to the reverse connection control signals.

Moreover, in a second aspect, embodiments of the present application further provide a lithium battery system. The lithium battery system includes a charger, a battery and the battery protection circuit as described in the first aspect. The battery comprises a cell, a first electrode and a second electrode. A positive pole of the charger is connected to the first electrode. A negative pole of the charger is connected to the second electrode.

DETAILED DESCRIPTION

The present application is described hereinafter in conjunction with drawings and embodiments.

Figure 1:
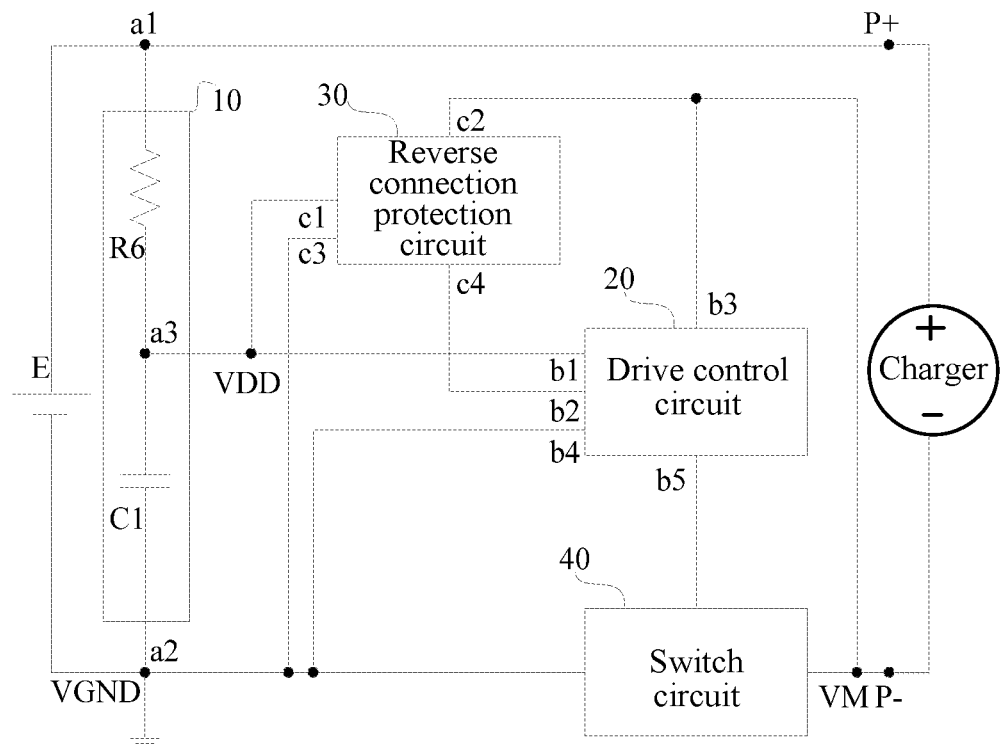
FIG. 1 is a diagram illustrating the structure of a battery protection circuit according to embodiments of the present application.

FIG. 1 is a diagram illustrating the structure of a battery protection circuit according to embodiments of the present application. Referring to FIG. 1, a battery includes a cell E, a first electrode P+ and a second electrode P−. The battery protection circuit includes a switch circuit 40, a drive control circuit 20, a reverse connection protection circuit 30 and a power supply circuit 10.

A first pole of the cell E is connected to the first electrode P+. A second pole of the cell E is connected to the second electrode P− through the switch circuit 40. A first terminal a1 of the power supply circuit 10 is connected to the first pole of the cell E. A second terminal a2 of the power supply circuit 10 is connected to the second pole of the cell E.

The drive control circuit 20 includes a first input terminal b1, a second input terminal b2, a third input terminal b3, a fourth input terminal b4 and an output terminal b5.

The reverse connection protection circuit 30 includes a first input terminal c1, a second input terminal c2, a third input terminal c3 and an output terminal c4.

The third input terminal b3 of the drive control circuit 20 is connected to the second electrode P−. The fourth input terminal b4 of the drive control circuit 20 is connected to the second pole of the cell E. The second input terminal c2 of the reverse connection protection circuit 30 is connected to the second electrode P−. The third input terminal c3 of the reverse connection protection circuit 30 is connected to the second pole of the cell E. The first input terminal b1 of the drive control circuit 20 and the first input terminal c1 of the reverse connection protection circuit 30 are each connected to the output terminal a3 of the power supply circuit 10.

The output terminal b5 of the drive control circuit 20 is connected to the switch circuit 40. The drive control circuit 20 is configured to turn on or off the switch circuit 40. The output terminal c4 of the reverse connection protection circuit 30 is connected to the second input terminal b2 of the drive control circuit 20. The reverse connection protection circuit 30 is configured to respond to a reverse connection state between the battery and a charger and output reverse connection control signals. The drive control circuit 20 is configured to turn off the switch circuit 40 according to the reverse connection control signals.

In the present embodiment, the battery may be a lithium battery, and the cell E may be a lithium battery cell E. The first pole of the cell E may be the positive pole or the negative pole of the cell E, and the second pole of the cell E may be the positive pole or the negative pole of the cell E. The first electrode P+ may be connected to the positive pole or the negative pole of a charge power supply (that is a charger), and the second electrode P− may be connected to the negative pole or the positive pole of the charge power supply (that is the charger). The voltage of the second electrode P− is a first voltage VM, and the voltage of the negative pole of the cell E is a ground voltage VGND. The output terminal a3 of the power supply circuit 10 supplies a second voltage VDD to the first input terminal b1 of the drive control circuit 20 and the first input terminal c1 of the reverse connection protection circuit 30. The switch circuit 40 may include a switch element and other elements.

Exemplarily, FIG. 1 is a diagram illustrating the structure of a battery protection circuit when the battery is positively connected. That is, the positive pole of the cell E is connected to the positive pole of the charge power supply, and the negative pole of the cell E is connected to the negative pole of the charge power supply through the switch circuit 40. Referring to the diagram illustrating the structure of the battery protection circuit in FIG. 1, when the battery is positively connected to a charger, the working process of the battery protection circuit may be described as follows. Since the battery is positively connected, the first voltage VM is lower than the second voltage VDD. The output terminal b5 of the drive control circuit 20 outputs first switch control signals to turn on the switch circuit 40 so as to enable the charge power supply (that is the charger) to charge the battery through the battery protection circuit, or enable the battery to discharge the load through the battery protection circuit. When the over-discharge, over-charge, over-current and discharge short-circuit situations of the battery occur, the output terminal b5 of the drive control circuit 20 outputs second switch control signals to turn off the switch circuit 40 so as to protect the battery and the battery protection circuit.

Figure 2:
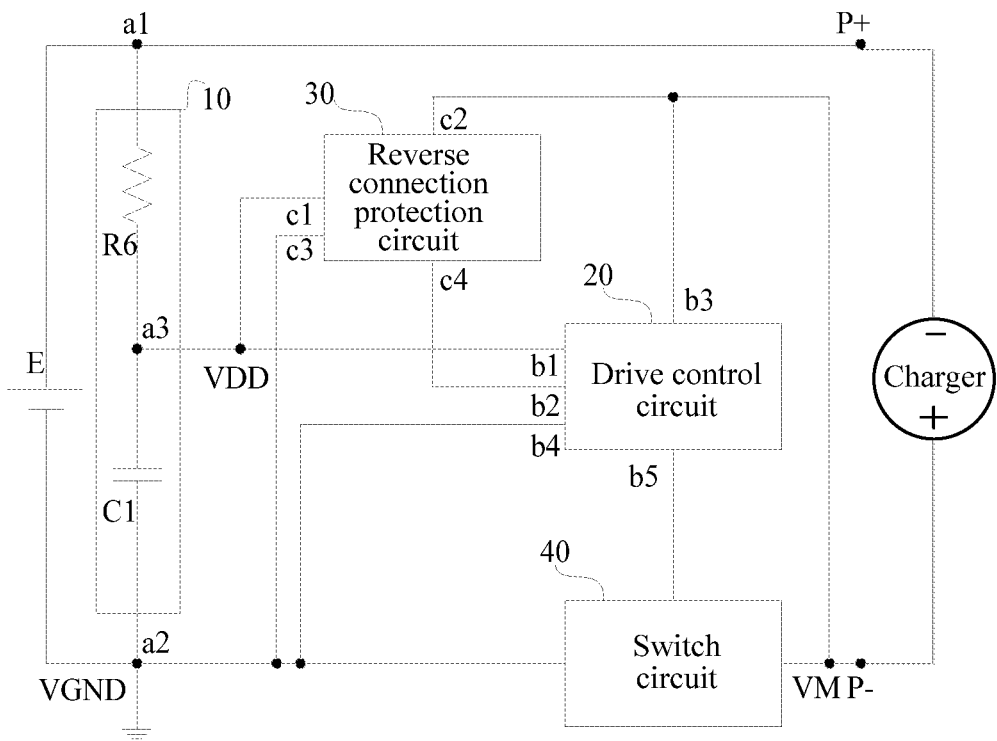
FIG. 2 is a diagram illustrating the structure of the battery protection circuit shown in FIG. 1 when the battery is reversely connected to a charger.

FIG. 2 is a diagram illustrating the structure of the battery protection circuit shown in FIG. 1 when the battery is reversely connected to a charger. When the battery is reversely connected to the charger, the working process of the battery protection circuit may be as follows. The drive control circuit 20 determines that the battery is in a short-circuit or discharge over-current situation based on the detection of a large current passing through the switch circuit 40 by the third output terminal b3 of the drive control circuit 20 and outputs the second switch control signals from the output terminal b5 of the drive control circuit 20 to turn off the switch circuit 40. At this time, if the charger makes frequent contact or separation with the first electrode P+ and the second electrode P− due to multiple contacts, the switch circuit 40 is frequently turned off or on, easily damaging the switch circuit 40, the battery or the battery protection circuit. Meanwhile, when the charger (that is the charge power supply) is removed, the charger makes frequent contact or separation with the first electrode P+ and the second electrode P, so the switch circuit 40 is frequently turned off or on, easily damaging the switch circuit 40, the battery or the battery protection circuit.

The battery protection circuit in the present embodiment includes the reverse connection protection circuit 30. When the drive control circuit 20 determines that the battery is in a short-circuit or a discharge over-current situation and outputs the second switch control signals from the output terminal b5 of the drive control circuit 20 to turn off the switch circuit 40 at the same time, the first voltage VM rises. The reverse connection protection circuit 30 outputs the reverse connection control signals according to the first voltage VM, and then the drive control circuit 20 continues turning off the switch circuit 40 according to the reverse connection control signals. That is, the switch circuit 40 is kept off by the drive control circuit 20 according to the reverse connection control signals. In this manner, even though the charger is removed, the switch circuit 20 is kept off. For example, when the first voltage VM is higher than the set voltage magnitude, a comparator circuit inside the drive control circuit 20 outputs a low level. After a set delay, the output terminal b5 of the drive control circuit 20 outputs the low level to turn off the switch circuit 40. When the charger (that is the charge power supply) is powered up or removed, even though the charge power supply makes frequent contact or separation with the first electrode P+ and the second electrode P−, the switch circuit 20 is kept off, but not frequently turned off or on, thereby improving the anti-interference and stability of the system and ensuring the safety of the switch circuit 40, the battery or the battery protection circuit.

Figure 3:
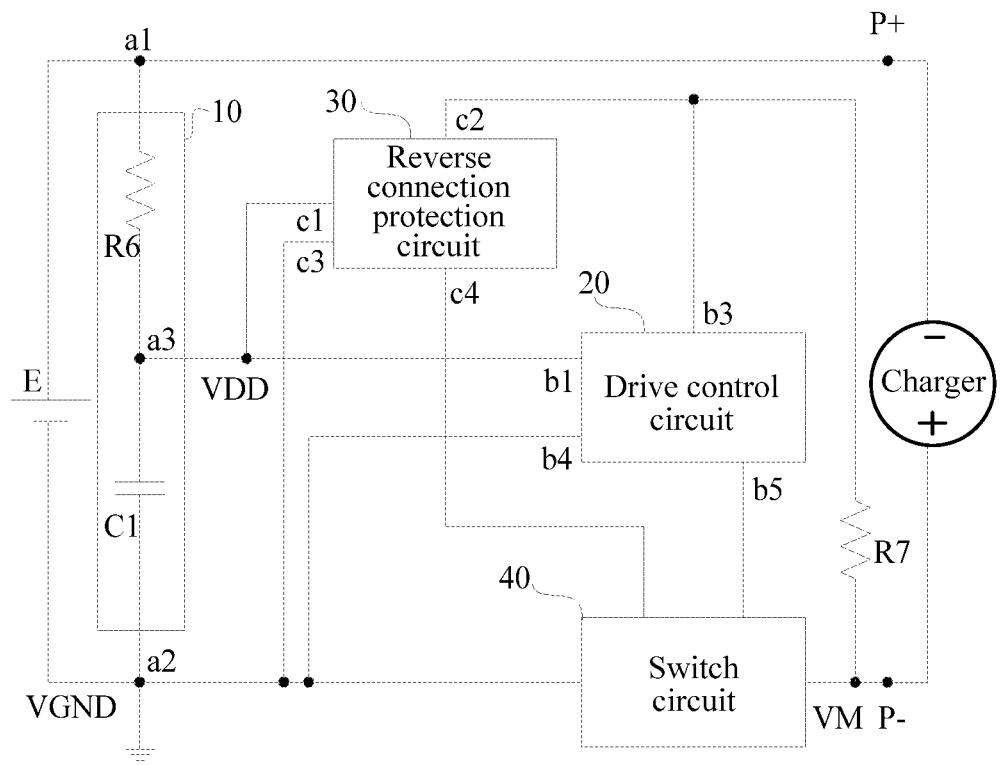
FIG. 3 is a diagram illustrating the structure of another battery protection circuit according to embodiments of the present application.

Alternatively, referring to FIG. 3, FIG. 3 is a diagram illustrating the structure of another battery protection circuit according to embodiments of the present application. The output terminal b5 of the drive control circuit 20 is connected to the switch circuit 40. The drive control circuit 20 is configured to turn on or off the switch circuit 40. The output terminal c4 of the reverse connection protection circuit 30 is connected to the switch circuit 40. The reverse connection protection circuit 30 is configured to output the reverse connection control signals to turn off the switch circuit 40 under the reverse connection state between the battery and the charger.

Exemplarily, FIG. 3 is a diagram illustrating the structure of a battery protection circuit when the battery is positively connected. That is, the positive pole of the cell E is connected to the positive pole of the charge power supply. The negative pole of the cell E is connected to the negative pole of the charge power supply through the switch circuit 40. Referring to the diagram illustrating the structure of the battery protection circuit in FIG. 3, when the battery is positively connected to a charger, the working process of the battery protection circuit may be described as follows. Since the battery is positively connected, the first voltage VM is lower than the second voltage VDD. The output terminal b5 of the drive control circuit 20 outputs the first switch control signals to turn on the switch circuit 40 so as to enable the charge power supply to charge the battery through the battery protection circuit, or enable the battery to discharge the load through the battery protection circuit. When the over-discharge, over-charge, over-current and discharge short-circuit situations of the battery occur, the output terminal b5 of the drive control circuit 20 outputs the second switch control signals to turn off the switch circuit 40 so as to protect the battery and the battery protection circuit.

Figure 4:
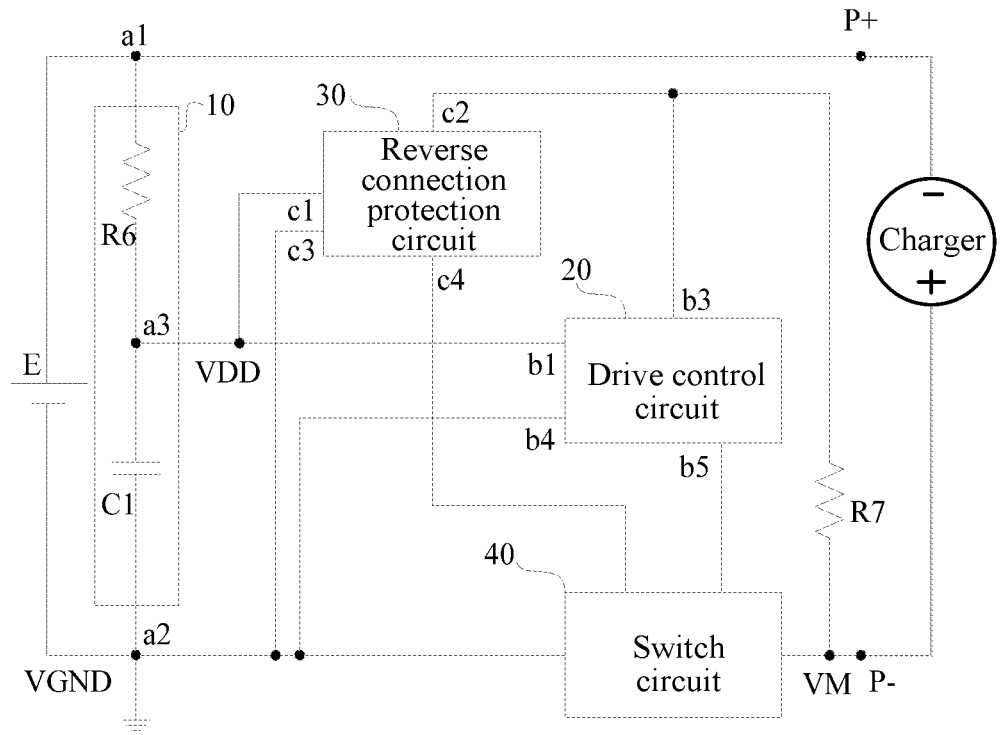
FIG. 4 is a diagram illustrating the structure of the battery protection circuit shown in FIG. 3 when the battery is reversely connected to a charger.

FIG. 4 is a diagram illustrating the structure of the battery protection circuit shown in FIG. 3 when the battery is reversely connected to a charger. When the battery is reversely connected to the charger, the working process of the battery protection circuit may be described as follows. The drive control circuit 20 determines that the battery is in a short-circuit or discharge over-current situation based on the detection of a large current passing through the switch circuit 40 by the third output terminal b3 of the drive control circuit 20 and outputs the second switch control signals from the output terminal b5 of the drive control circuit 20 to turn off the switch circuit 40. When the drive control circuit 20 determines that the battery is in a short-circuit or discharge over-current state and outputs the second switch control signals from the output terminal b5 of the drive control circuit 20 at the same time, the first voltage VM rises. The reverse connection protection circuit 30 outputs the reverse connection control signals according to the first voltage VM and turns off the switch circuit 40 through the reverse connection control signals. That is, the reverse connection protection circuit 30 outputs the reverse connection control signals according to the first voltage VM and keeps the switch circuit 40 off directly through the reverse connection control signals.

Even though the charger is removed, the switch circuit 40 is kept off. When the charge power supply is powered up or removed, even though the charge power supply makes frequent contact or separation with the first electrode P+ and the second electrode P−, the switch circuit 40 is kept off, but not frequently turned off or on, thereby improving the anti-interference and stability of the system and ensuring the safety of the switch circuit 40, the battery or the battery protection circuit.

In addition, the battery protection circuit in FIG. 1 may be applied to protect a single wafer lithium battery. In the battery protection circuit in FIG. 1, the third input terminal b3 of the drive control circuit 20 and the second input terminal c2 of the reverse connection protection circuit 30 are each connected to the negative pole of the charge power supply, so the battery protection circuit in FIG. 1 is a negative pole battery protection circuit.

Figure 5:
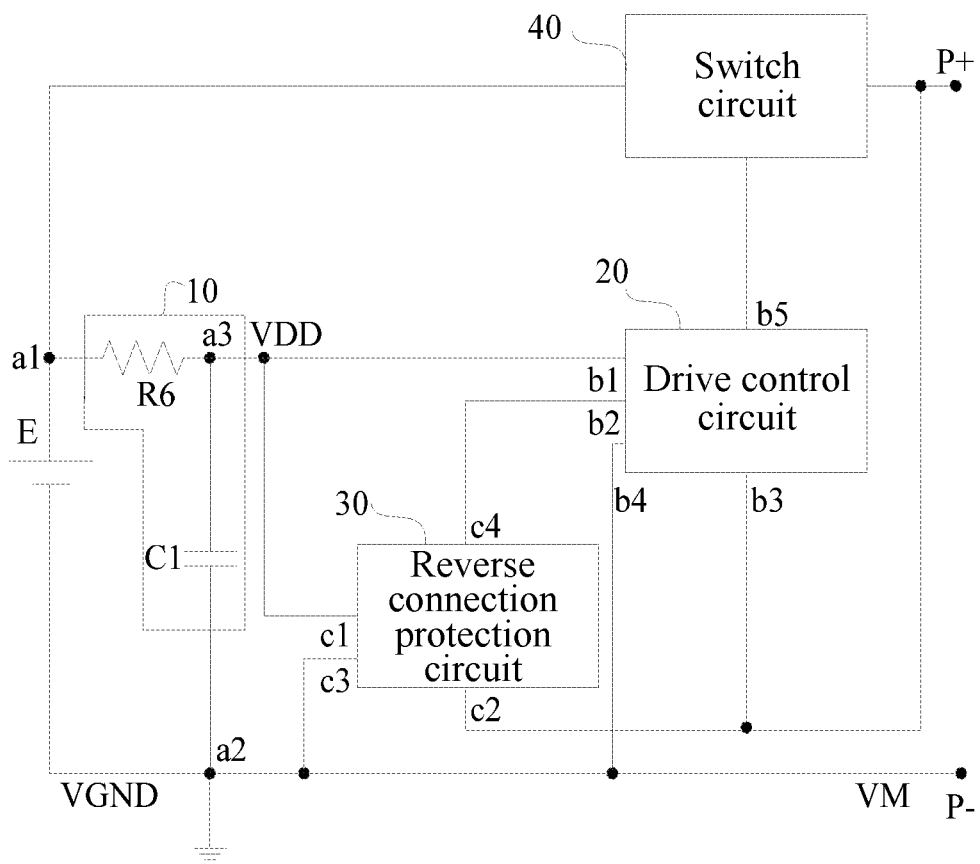
FIG. 5 is a diagram illustrating the structure of a positive pole battery protection circuit corresponding to the battery protection circuit in FIG. 1.

Referring to FIG. 5, FIG. 5 is a diagram illustrating the structure of a positive pole battery protection circuit corresponding to the battery protection circuit in FIG. 1. The third input terminal b3 of the drive control circuit 20 and the second input terminal c2 of the reverse connection protection circuit 30 are each connected to the positive pole of the charge power supply. In the present embodiment, the positive pole battery protection circuit in FIG. 5 and the negative pole battery protection circuit in FIG. 1 belong to the same inventive conception, so the technical effects of the positive pole battery protection circuit in FIG. 5 can achieve the same beneficial effects as the technical effects of the negative pole battery protection circuit in FIG. 1. The repeated content is not described herein.

Figure 6:
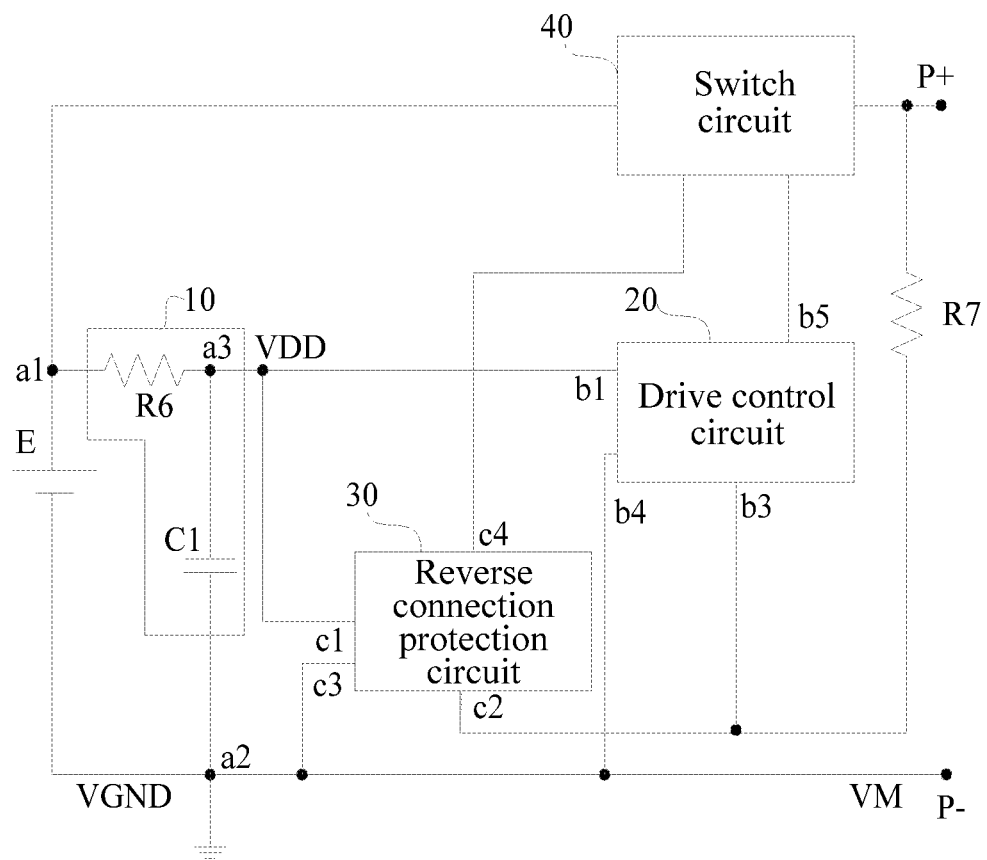
FIG. 6 is a diagram illustrating the structure of a positive pole battery protection circuit corresponding to another battery protection circuit in FIG. 3.

Alternatively, referring to FIG. 6, FIG. 6 is a diagram illustrating the structure of a positive pole battery protection circuit corresponding to another battery protection circuit in FIG. 3. The third input terminal b3 of the drive control circuit 20 and the second input terminal c2 of the reverse connection protection circuit 30 are each connected to the positive pole of the charge power supply. In the present embodiment, the positive pole battery protection circuit in FIG. 6 and the negative pole battery protection circuit in FIG. 3 belong to the same inventive conception, so the technical effects of the positive pole battery protection circuit in FIG. 6 can achieve the same beneficial effects as the technical effects of the negative pole battery protection circuit in FIG. 3. The repeated content is not described herein.

Figure 7:
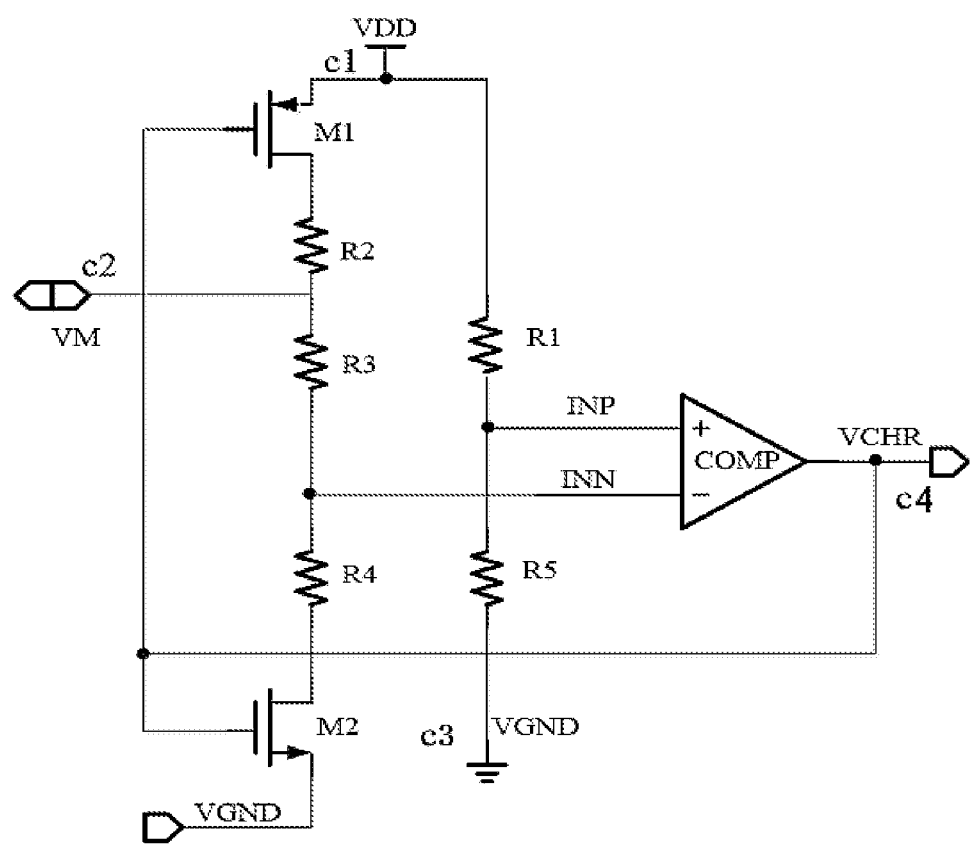
FIG. 7 is a circuit diagram of a reverse connection protection circuit according to embodiments of the present application.

FIG. 7 is a circuit diagram of a reverse connection protection circuit according to embodiments of the present application. Referring to FIG. 7, in one embodiment, the reverse connection protection circuit 30 includes a first transistor M1, a second transistor M2, a first comparator COMP, a first resistor R1, a second resistor R2, a third resistor R3, a fourth resistor R4 and a fifth resistor R5.

A first pole of the first transistor M1 is connected to a first terminal of the first resistor R1. The first pole of the first transistor M1 serves as the first input terminal c1 of the reverse connection protection circuit 30. A second pole of the first transistor M1 is connected to a first terminal of the second resistor R2.

A second terminal of the second resistor R2 is connected to a first terminal of the third resistor R3. The second terminal of the second resistor R2 serves as the second input terminal c2 of the reverse connection protection circuit 30.

A second terminal of the third resistor R3 is connected to a first terminal of the fourth resistor R4.

A first pole of the second transistor M2 is connected to a second terminal of the fourth resistor R4. A second pole of the second transistor M2 is connected to the second pole of the cell E. A gate of the second transistor M2 is connected to a gate of the first transistor M1.

A first input terminal of the first comparator COMP is connected to a second terminal of the first resistor R1. A second input terminal of the first comparator COMP is connected to the first terminal of the fourth resistor R4. An output terminal of the first comparator COMP is connected to the gate of the second transistor M2. The output terminal of the first comparator COMP serves as the output terminal c4 of the reverse connection protection circuit 30.

A first terminal of the fifth resistor R5 is connected to the second terminal of the first resistor R1. A second terminal of the fifth resistor R5 serves as the third input terminal c3 of the reverse connection protection circuit 30.

Exemplarily, referring to FIG. 7, the first transistor M1 is a P-type transistor. The second transistor M2 is an N-type transistor. The first pole of the first transistor M1 is a source of the P-type MOS transistor. The second pole of the first transistor M1 is a drain of the P-type MOS transistor. The first pole of the second transistor M2 is a drain of the N-type MOS transistor. The second pole of the second transistor M2 is a source of the N-type MOS transistor.

The first input terminal of the first comparator COMP is a positive input terminal INP of the first comparator COMP. The second input terminal of the first comparator COMP is a negative input terminal INN of the first comparator COMP. The second voltage VDD is 3 V to 4.2 V. The voltage VCH of the charge power supply is 5 V or above. When the drive control circuit 20 determines that the battery is in a short-circuit or discharge over-current situation and outputs the second switch control signals from the output terminal b5 of the drive control circuit 20 to turn off the switch circuit 40 at the same time, the first voltage VM rises, the first transistor M1 is turned on, the second transistor M2 is turned off, the voltage VIPN of the positive input terminal INP of the first comparator COMP is lower than the voltage VINN of the negative input terminal INN of the first comparator COMP, and the third voltage VCHR output from the output terminal of the first comparator COMP is at a low level, that is, the reverse connection control signals are at low levels. The drive control circuit 20 or the reverse connection protection circuit 30 keeps the switch circuit 40 off according to the reverse connection control signals.

To explain the working process of the reverse connection protection circuit 30 in the present embodiment, the specific magnitude of each resistor is taken as an example to illustrate the working process of the reverse connection protection circuit 30, where VDD=4.0 V, R3/R4=7/3, and R1/R5=2/3, the positive input voltage of the positive input terminal INP of the first comparator COMP is VIPN and the negative input voltage of the negative input terminal INN of the first comparator COMP is VINN. When the drive control circuit 20 determines that the battery is in a short-circuit or discharge over-current situation and outputs the second switch control signals from the output terminal b5 of the drive control circuit 20 to turn off the switch circuit 40 at the same time, $$VM=VDD+VCH=4.0V+5.0V=9.0V,$$

$$VINN=VM*R4/(R3+R4)=2.7V, VIPN=VDD*R5/(R1+R5)=2.4V.$$

That is, the voltage VIPN of the positive input terminal INP of the first comparator COMP is lower than the voltage VINN of the negative input terminal INN of the first comparator COMP, so the third voltage VCHR output from the output terminal of the first comparator COMP is at a low level, that is, the reverse connection control signals are at low levels. The drive control circuit 20 or the reverse connection protection circuit 30 turns off the switch circuit 40 according to the reverse connection control signals. The first transistor M1 is turned on, the second transistor M2 is turned off, VINN=VM=9.0 V, the voltage VIPN of the positive input terminal INP of the first comparator COMP is kept lower than the voltage VINN of the negative input terminal INN of the first comparator COMP, that is, the reverse connection control signals are kept at low levels. The drive control circuit 20 or the reverse connection protection circuit 30 keeps the switch circuit 40 off according to the reverse connection control signals. The charge power supply that is reversely connected is removed, VINN=VM=VDD=4.0 V, the voltage VIPN of the positive input terminal INP of the first comparator COMP is kept lower than the voltage VINN of the negative input terminal INN of the first comparator COMP, that is, the reverse connection control signals are kept at low levels. The drive control circuit 20 or the reverse connection protection circuit 30 keeps the switch circuit 40 off according to the reverse connection control signals.

Figure 8:
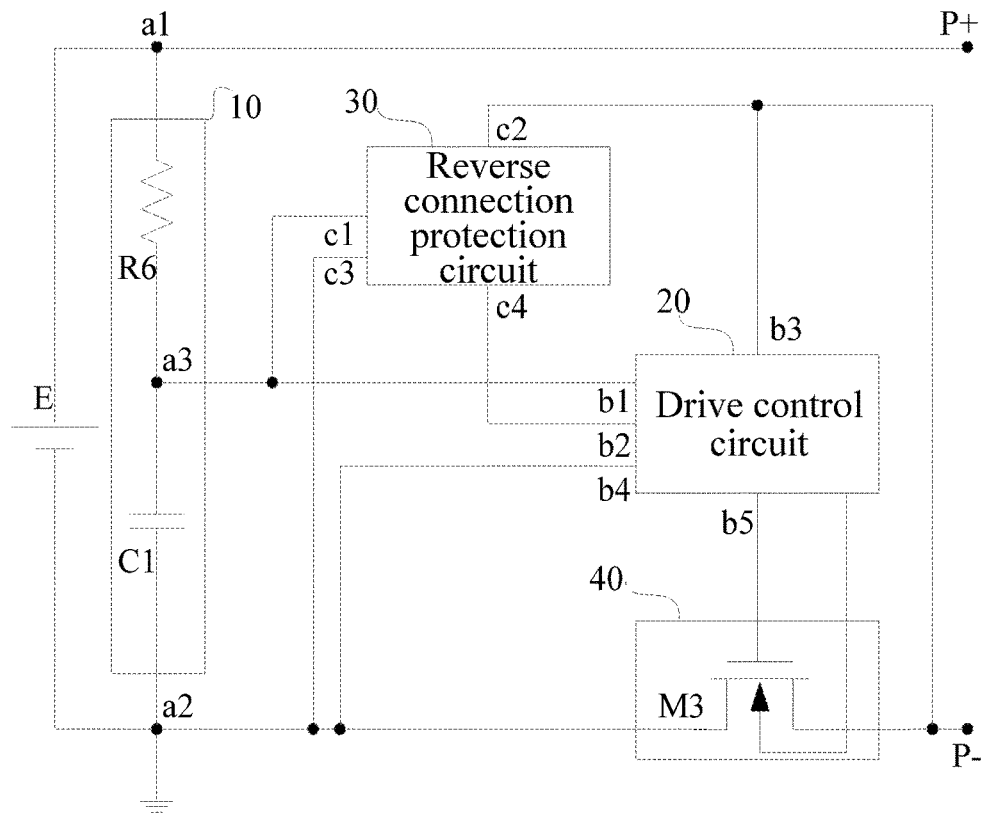
FIG. 8 is a diagram illustrating the structure of another battery protection circuit according to embodiments of the present application.

FIG. 8 is a diagram illustrating the structure of another battery protection circuit according to embodiments of the present application. As shown in FIG. 8, in one embodiment, the switch circuit 40 includes a third transistor M3. The output terminal b5 of the drive control circuit 20 is connected to a gate of the third transistor M3. A first pole of the third transistor M3 is connected to the second pole of the cell E. A second pole of the third transistor M3 is connected to the second electrode P−. A substrate of the third transistor M3 is connected to the drive control circuit 20. For example, the third transistor M3 may be an N-type MOS transistor.

Figure 9:
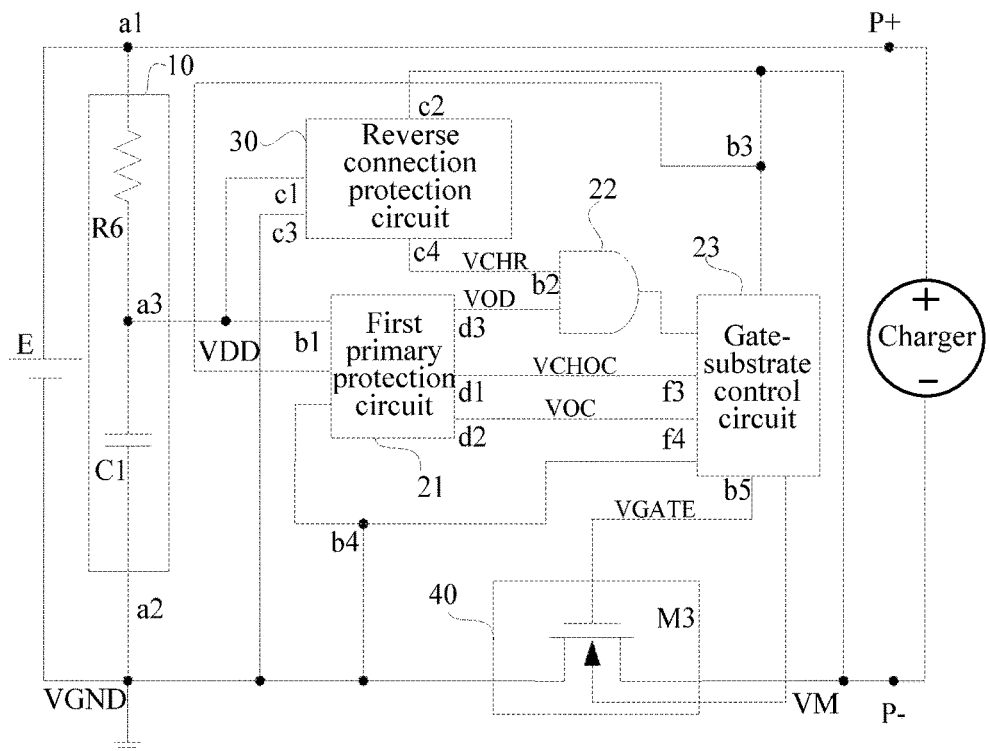
FIG. 9 is a diagram illustrating the structure of another battery protection circuit according to embodiments of the present application.

FIG. 9 is a diagram illustrating the structure of another battery protection circuit according to embodiments of the present application. As shown in FIG. 9, in one embodiment, the drive control circuit 20 includes a first primary protection circuit 21, a first AND gate 22 and a gate-substrate control circuit 23.

A first input terminal of the first primary protection circuit 21 serves as the first input terminal b1 of the drive control circuit 20. After a second input terminal of the first primary protection circuit 21 is connected to a first input terminal of the gate-substrate control circuit 23, the first input terminal of the gate-substrate control circuit 23 serves as the third input terminal b3 of the drive control circuit 20. After a third input terminal of the first primary protection circuit 21 is connected to a second input terminal of the gate-substrate control circuit 23, the third input terminal of the first primary protection circuit 21 serves as the fourth input terminal b4 of the drive control circuit 20.

A first output terminal d1 of the first primary protection circuit 21 is connected to a third input terminal f3 of the gate-substrate control circuit 23. A second output terminal d2 of the first primary protection circuit 21 is connected to a fourth input terminal f4 of the gate-substrate control circuit 23.

A first input terminal of the first AND gate 22 serves as the second input terminal b2 of the drive control circuit 20. A second input terminal of the first AND gate 22 is connected to a third output terminal d3 of the first primary protection circuit 21. An output terminal of the first AND gate 22 is connected to a fifth input terminal of the gate-substrate control circuit 23. An output terminal of the gate-substrate control circuit 23 serves as the output terminal b5 of the drive control circuit 20. The substrate of the third transistor M3 is connected to the gate-substrate control circuit 23.

Referring to FIG. 9, the positive pole of the cell E is connected to the positive pole of the charge power supply, and the negative pole of the cell E is connected to the negative pole of the charge power supply through the switch circuit 40. When the battery is positively connected to the charger, the working process of the battery protection circuit may be described as follows. Since the battery is positively connected to the charger, the first voltage VM is lower than the second voltage VDD. The output terminal of the gate-substrate control circuit 23 outputs the first control signals VGATE to turn on the switch circuit 40 so as to enable the charge power supply to charge the battery through the battery protection circuit or enable the battery to discharge the load through the battery protection circuit. The first output terminal d1 of the first primary protection circuit 21 outputs the second control signals VCHOC, the second output terminal d2 of the first primary protection circuit 21 outputs third control signals VOC, and the third output terminal d3 of the first primary protection circuit 21 outputs fourth control signals VOD so that the switch circuit 40 is turned on or off through the gate-substrate control circuit 23 so as to protect the over-discharge, over-charge, over-current and discharge short-circuit situations of the battery.

In conjunction with FIGS. 7 to 9, when the battery is positively connected to the charger, the fourth control signals output from the third output terminal d3 of the first primary protection circuit 21 are at high levels, the first voltage VM is lower than the second voltage VDD, the voltage VIPN of the positive input terminal INP of the first comparator COMP is higher than the voltage VINN of the negative input terminal INN of the first comparator COMP, the third voltage VCHR output from the output terminal of the first comparator COMP is at the high level; the output terminal of the first AND gate 22 outputs the high level, and the gate-substrate control circuit 23 outputs the first control signals VGATE to turn on the third transistor M3, that is, the switch circuit 40 is turned on.

When the charger is reversely connected to the charger, the first primary protection circuit 21 determines that the battery is in a short-circuit or discharge over-current situation based on the detection of a large current passing through the switch circuit 40 by the second input terminal of the first primary protection circuit 21 and outputs the fourth control signals VOD that are at low levels from the third output terminal d3 of the first primary protection circuit 21 so that the switch circuit 40 is turned off through the first AND gate 22 and the gate-substrate control circuit 23. Meanwhile, the first voltage VM rises. The reverse connection protection circuit 30 outputs the reverse connection control signals according to the first voltage VM. The gate-substrate control circuit 23 continues turning off the switch circuit 40 according to the reverse connection control signals. That is, the gate-substrate control circuit 23 keeps the switch circuit 40 off according to the reverse connection control signals so that the switch circuit 40 is kept off, but not frequently turned off or on during the whole process from the reverse connection moment of the battery to the positive connection of the charge power supply, thereby improving the anti-interference and stability of the system and ensuring the safety of the switch circuit 40, the battery or the battery protection circuit.

Figure 10:
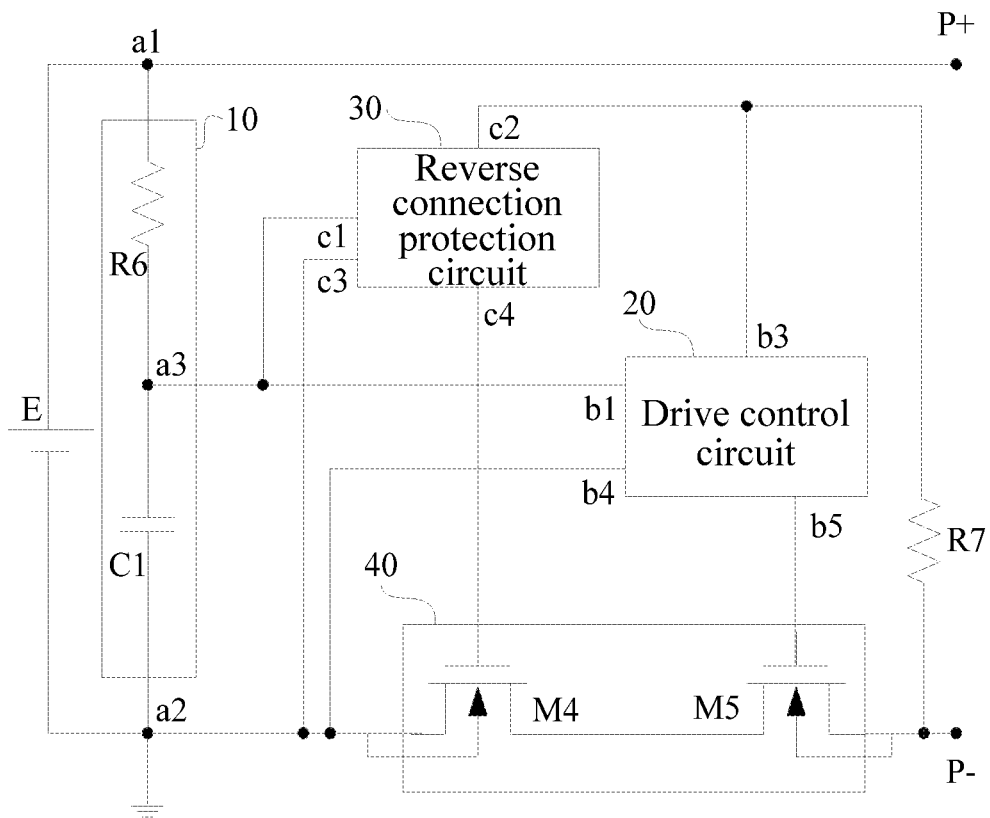
FIG. 10 is a diagram illustrating the structure of another battery protection circuit according to embodiments of the present application.

FIG. 10 is a diagram illustrating the structure of another battery protection circuit according to embodiments of the present application. As shown in FIG. 10, in one embodiment, the switch circuit 40 includes a fourth transistor M4 and a fifth transistor M5.

The output terminal c4 of the reverse connection protection circuit 30 is connected to a gate of the fourth transistor M4. A first pole of the fourth transistor M4 is connected to the second pole of the cell E. A substrate of the fourth transistor M4 is connected to the first pole of the fourth transistor M4.

A first pole of the fifth transistor M5 is connected to a second pole of the fourth transistor M4. A gate of the fifth transistor M5 is connected to the output terminal b5 of the drive control circuit 20. A second pole of the fifth transistor M5 is connected to the second electrode P−. A substrate of the transistor M5 is connected to the second pole of the fifth transistor M5.

In one embodiment, the fourth transistor M4 and the fifth transistor M5 both may be N-type MOS transistors.

In one embodiment, the first pole of the fourth transistor M4 is a source, and the second pole of the fourth transistor M4 is a drain.

In one embodiment, the first pole of the fourth transistor M5 is a drain, and the second pole of the fourth transistor M5 is a source.

Figure 11:
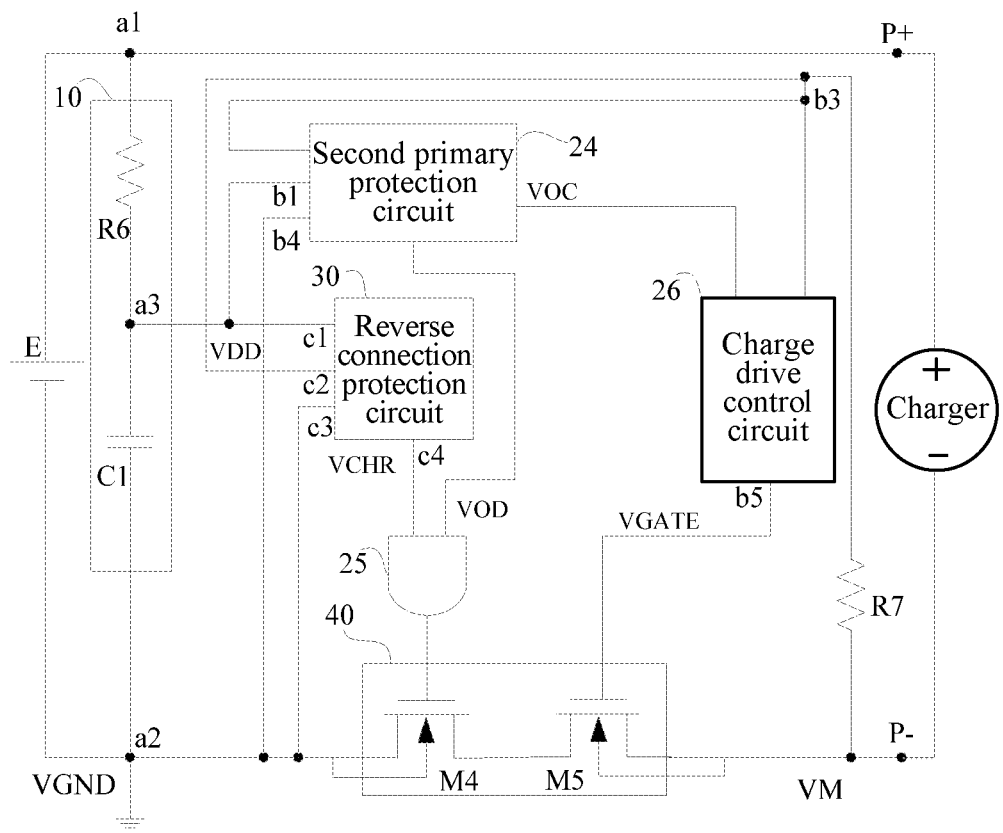
FIG. 11 is a diagram illustrating the structure of another battery protection circuit according to embodiments of the present application.

FIG. 11 is a diagram illustrating the structure of another battery protection circuit according to embodiments of the present application. As shown in FIG. 11, in one embodiment, the drive control circuit 20 includes a second primary protection circuit 24, a second AND gate 25 and a charge drive control circuit 26.

A first input terminal of the second primary protection circuit 24 serves as the first input terminal b1 of the drive control circuit 20. After a second input terminal of the second primary protection circuit 24 is connected to a first input terminal of the charge drive control circuit 26, the first input terminal of the charge drive control circuit 26 serves as the third input terminal b3 of the drive control circuit 20. A third input terminal of the second primary protection circuit 24 serves as the fourth input terminal b4 of the drive control circuit 20.

A first output terminal of the second primary protection circuit 24 is connected to a second input terminal of the charge drive control circuit 26. An output terminal of the charge drive control circuit 26 serves as the output terminal b5 of the drive control circuit 20.

A first input terminal of the second ANG gate 25 is connected to a second output terminal of the second primary protection circuit 24. A second input terminal of the second AND gate 25 is connected to the output terminal c4 of the reverse connection protection circuit 30. An output terminal of the second AND gate 25 is connected to the gate of the fourth transistor M4.

With continued reference to FIG. 11, in one embodiment, the power supply circuit 10 includes a sixth resistor R6 and a first capacitor C1. A first terminal of the sixth resistor R6 serves as the first terminal a1 of the power supply circuit 10. A second terminal of the sixth resistor R6 serves as the output terminal a3 of the power supply circuit 10. The second terminal of the sixth resistor R6 is connected to a first terminal of the first capacitor C1. A second terminal of the first capacitor C1 serves as the second terminal a2 of the power supply circuit 10.

Referring to FIG. 11, the positive pole of the cell E is connected to the positive pole of the charge power supply, and the negative pole of the cell E is connected to the negative pole of the charge power supply through the switch circuit 40. When the battery is positively connected to the charger, the working process of the battery protection circuit may be described as follows. Since the battery is positively connected to the charger, the first voltage VM is lower than the second voltage VDD. The output terminal b5 of the charge drive control circuit 26 outputs the first control signals VGATE to turn on the switch circuit 40 so as to enable the charge power supply to charge the battery through the battery protection circuit or enable the battery to discharge the load through the battery protection circuit. The first output terminal of the second primary protection circuit 24 outputs the third control signals VOC, and the second output terminal of the second primary protection circuit 24 outputs the fourth control signals VOD so that the switch circuit 40 is turned on or off through the charge drive control circuit 26 so as to protect the over-discharge, over-charge, over-current and discharge short-circuit situations of the battery.

In conjunction with FIG. 7 and FIGS. 10 to 11, when the battery is positively connected to the charger, the first output terminal of the second primary protection circuit 24 and the second output terminal of the second primary protection circuit 24 output the third control signals VOC and the fourth control signals COD that are at high levels; the first voltage VM is lower than the second voltage VDD, the voltage VIPN of the positive input terminal INP of the first comparator COMP is higher than the voltage VINN of the negative input terminal INN of the first comparator COMP, the third voltage VCHR output from the output terminal of the first comparator COMP is at the high level, the charge drive control circuit 26 outputs the first control signals VGATE according to the third control signals VOC to turn on the fifth transistor M5, and the high levels output from the output terminal of the first AND gate turn on the fourth transistor M4, that is, the switch circuit 40 is turned on.

When the charger is reversely connected to the charger, the second primary protection circuit 24 determines that the battery is in a short-circuit or discharge over-current situation based on the detection of a large current passing through the switch circuit 40 by the second input terminal of the second primary protection circuit 24 and outputs the fourth control signals VOD that are at low levels from the second output terminal of the second primary protection circuit 24 so that the switch circuit 40 is turned off through the first AND gate 22. Meanwhile, the first voltage VM rises. The reverse connection protection circuit 30 outputs the reverse connection control signals according to the first voltage VM and turns off the switch circuit 40 through the second AND gate 25. That is, the reverse connection protection circuit 30 outputs the reverse connection control signals according to the first voltage VM and keeps the switch circuit 40 off directly through the second AND gate 25 so that the switch circuit 40 is kept off, but not frequently turned off or on during the whole process from the reverse connection moment of the battery to the positive connection of the charge power supply, thereby improving the anti-interference and stability of the system and ensuring the safety of the switch circuit 40, the battery or the battery protection circuit.

With continued reference to FIG. 11, in one embodiment, the battery protection circuit further includes a seventh resistor R7. After the second input terminal of the second primary protection circuit 24 is connected to the first input terminal of the charge drive control circuit 26, the second electrode P− is connected to the third input terminal b3 of the drive control circuit 20 through the seventh resistor R7.

The battery protection circuit further includes the seventh resistor R7 to prevent a spike voltage at the first electrode P+ or the second electrode P− from damaging the battery protection circuit.

The battery protection circuit according to embodiments of the present application includes a switch circuit, a drive control circuit, a reverse connection protection circuit and a power supply circuit. First, with the arrangement of the drive control circuit, a first input terminal of the drive control circuit is connected to an output terminal of the power supply circuit, an output terminal of the drive control circuit is connected to the switch circuit, and the drive control circuit is configured to turn on or off the switch circuit. In this manner, when the battery is reversely connected to a charger, the drive control circuit can turn off the switch circuit so as to implement the reverse connection protection of the battery protection circuit and the battery. Furthermore, with the arrangement of the reverse connection protection circuit, a first input terminal of the reverse connection protection circuit is connected to the output terminal of the power supply circuit, an output terminal of the reverse connection protection circuit is connected to a second input terminal of the drive control circuit, the reverse connection protection circuit is configured to output reverse connection control signals when the battery is reversely connected to the charger, and the drive control circuit turns off the switch circuit according to the reverse connection control signals. In this manner, when the battery is reversely connected to the charger, the drive control circuit can turn off the switch circuit according to the reverse connection control signals output from the reverse connection protection circuit. Even though the charger is removed, the switch circuit is kept off to ensure that the switch circuit is kept off, but not frequently turned off or on so as to ensure the safety of the battery protection circuit and battery. Alternatively, the output terminal of the reverse connection protection circuit is connected to the switch circuit, and the reverse connection protection circuit is configured to output the reverse connection control signals when the battery is reversely connected to the charger to turn off the switch circuit. In this manner, when the charger is reversely connected, the reverse connection protection circuit can output the reverse connection control signals to directly turn off the switch circuit. Even though the charger is removed, the switch circuit is kept off to ensure that the switch circuit is kept off, but not frequently turned off or on so as to ensure the safety of the battery protection circuit and the battery.

Figure 12:
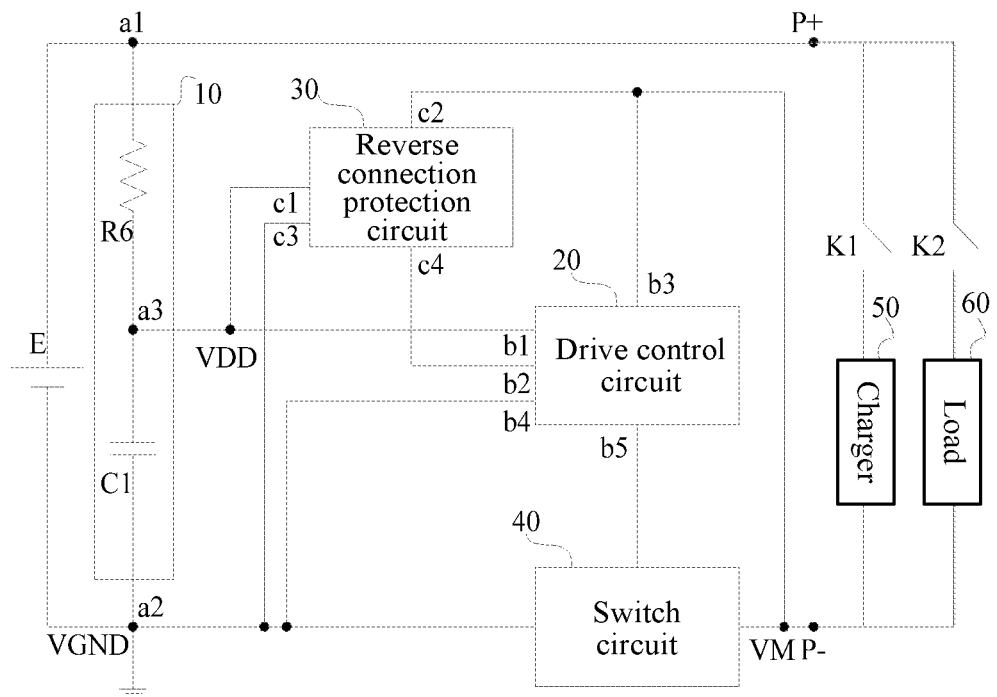
FIG. 12 is a diagram illustrating the structure of a lithium battery system according to embodiments of the present application.

Embodiments of the present application further provide a lithium battery system. FIG. 12 is a diagram illustrating the structure of a lithium battery system according to embodiments of the present application. Referring to FIG. 12, the lithium battery system includes a charger 50, a load 60 and the battery protection circuit described in the preceding embodiments. A positive pole of the charger 50 is connected to the first electrode P+. A negative pole of the charger 50 is connected to the second electrode P−. A first terminal of the load 60 is connected to the first electrode P+. A second terminal of the load 60 is connected to the second electrode P−. The lithium battery system includes a battery. For example, the battery is a lithium battery.

For example, the charger 50 may be regarded as a charge power supply connected to the lithium battery when the lithium battery is charged. When the charger 50 is reversely connected, the charger 50 is reversely connected between the first electrode P+ and the second electrode P−, and the lithium battery may discharge through the load 60. Moreover, the charger 50 may be connected between the first electrode P+ and the second electrode P− through a first switch K1. The first switch K1 controls the charger 50 to connect to the battery protection circuit or disconnect from the battery protection circuit. A second switch K2 controls the lithium battery to discharge or stop the discharge.

The lithium battery system according to embodiments of the present application and the battery protection circuit described in the preceding circuit embodiments belong to the same inventive conception. The lithium battery system can achieve the same technical effects as the battery protection circuit. The repeated content is not described herein again.

What is claimed is:

1. A battery protection circuit, wherein the battery protection circuit is connected to a battery, the battery comprises a cell, a second electrode, a first electrode connected to a first pole of the cell, and the battery protection circuit comprises:

a switch circuit, a drive control circuit, a reverse connection protection circuit and a power supply circuit, and wherein the drive control circuit comprises a first input terminal, a second input terminal, a third input terminal, a fourth input terminal and an output terminal;

the reverse connection protection circuit comprises a first input terminal, a second input terminal, a third input terminal and an output terminal;

the power supply circuit comprises a first input terminal, a second input terminal and an output terminal;

the switch circuit is connected between a second pole of the cell and the second electrode;

a first terminal of the power supply circuit is connected to the first pole of the cell, and a second terminal of the power supply circuit is connected to the second pole of the cell;

the third input terminal of the drive control circuit is connected to the second electrode, and the fourth input terminal of the drive control circuit is connected to the second pole of the cell;

the second input terminal of the reverse connection protection circuit is connected to the second electrode, and the third input terminal of the reverse connection protection circuit is connected to the second pole of the cell;

the first input terminal of the drive control circuit and the first input terminal of the reverse connection protection circuit are each connected to the output terminal of the power supply circuit;

the output terminal of the drive control circuit is connected to the switch circuit, and the drive control circuit is configured to control the switch circuit to be turned on or to be turned off; and the reverse connection protection circuit is disposed in one of the following manners:

the output terminal of the reverse connection protection circuit is connected to the second input terminal of the drive control circuit, the reverse connection protection circuit is configured to output a reverse connection control signal in response to a reverse connection state between the battery and a charger, and the drive control circuit is configured to control, according to the reverse connection control signal, the switch circuit to be turned off; or the output terminal of the reverse connection protection circuit is connected to the switch circuit, and the reverse connection protection circuit is configured to output a reverse connection control signal in response to a reverse connection state between the battery and a charger and control, according to the reverse connection control signal, the switch circuit to be turned off.

2. The battery protection circuit according to claim 1, wherein the reverse connection protection circuit comprises a first transistor, a second transistor, a first comparator, a first resistor, a second resistor, a third resistor, a fourth resistor and a fifth resistor, and wherein a first pole of the first transistor is connected to a first terminal of the first resistor, the first pole of the first transistor serves as the first input terminal of the reverse connection protection circuit, and a second pole of the first transistor is connected to a first terminal of the second resistor;

a second terminal of the second resistor is connected to a first terminal of the third resistor, and the second terminal of the second resistor serves as the second input terminal of the reverse connection protection circuit;

a second terminal of the third resistor is connected to a first terminal of the fourth resistor;

a first pole of the second transistor is connected to a second terminal of the fourth resistor, a second pole of the second transistor is connected to the second pole of the cell, a gate of the second transistor is connected to a gate of the first transistor;

a first input terminal of the first comparator is connected to a second terminal of the first resistor, a second input terminal of the first comparator is connected to the first terminal of the fourth resistor, an output terminal of the first comparator is connected to the gate of the second transistor, and the output terminal of the first comparator serves as the output terminal of the reverse connection protection circuit; and a first terminal of the fifth resistor is connected to the second terminal of the first resistor, and a second terminal of the fifth resistor serves as the third input terminal of the reverse connection protection circuit.

3. The battery protection circuit according to claim 1, wherein the switch circuit comprises a third transistor, wherein the output terminal of the drive control circuit is connected to a gate of the third transistor, a first pole of the third transistor is connected to the second pole of the cell, a second pole of the third transistor is connected to the second electrode, and a substrate of the third transistor is connected to the drive control circuit.

4. The battery protection circuit according to claim 3, wherein the drive control circuit comprises a first primary protection circuit, a first AND gate and a gate-substrate control circuit, wherein the first primary protection circuit comprises a first input terminal, a second input terminal, a third input terminal, a first output terminal, a second output terminal and a third output terminal;

the gate-substrate control circuit comprises a first input terminal, a second input terminal, a third input terminal, a fourth input terminal, a fifth input terminal and an output terminal;

the first input terminal of the first primary protection circuit serves as the first input terminal of the drive control circuit, the second input terminal of the first primary protection circuit is connected to the first input terminal of the gate-substrate control circuit, the first input terminal of the gate-substrate control circuit serves as the third input terminal of the drive control circuit, the third input terminal of the first primary protection circuit is connected to the second input terminal of the gate-substrate control circuit, and the third input terminal of the first primary protection circuit serves as the fourth input terminal of the drive control circuit;

the first output terminal of the first primary protection circuit is connected to the third input terminal of the gate-substrate control circuit, and the second output terminal of the first primary protection circuit is connected to the fourth input terminal of the gate-substrate control circuit;

a first input terminal of the first AND gate serves as the second input terminal of the drive control circuit, a second input terminal of the first AND gate is connected to the third output terminal of the first primary protection circuit, and an output terminal of the first AND gate is connected to the fifth input terminal of the gate-substrate control circuit; and the output terminal of the gate-substrate control circuit serves as the output terminal of the drive control circuit, and the substrate of the third transistor is connected to the gate-substrate control circuit.

5. The battery protection circuit according to claim 1, wherein the switch circuit comprises a fourth transistor and a fifth transistor, wherein the output terminal of the reverse connection protection circuit is connected to a gate of the fourth transistor, a first pole of the fourth transistor is connected to the second pole of the cell, and a substrate of the fourth transistor is connected to the first pole of the fourth transistor; and a first pole of the fifth transistor is connected to a second pole of the fourth transistor, a gate of the fifth transistor is connected to the output terminal of the drive control circuit, a second pole of the fifth transistor is connected to the second electrode, and a substrate of the fifth transistor is connected to the second pole of the fifth transistor.

6. The battery protection circuit according to claim 5, wherein the drive control circuit comprises a second primary protection circuit, a second AND gate and a charge drive control circuit, wherein the second primary protection circuit comprises a first input terminal, a second input terminal, a third input terminal, a first output terminal and a second output terminal;

the charge drive control circuit comprises a first input terminal, a second input terminal and an output terminal;

the first input terminal of the second primary protection circuit serves as the first input terminal of the drive control circuit, the second input terminal of the second primary protection circuit is connected to the first input terminal of the charge drive control circuit, the first input terminal of the charge drive control circuit serves as the third input terminal of the drive control circuit, and the third input terminal of the second primary protection circuit serves as the fourth input terminal of the drive control circuit;

the first output terminal of the second primary protection circuit is connected to the second input terminal of the charge drive control circuit, and the output terminal of the charge drive control circuit serves as the output terminal of the drive control circuit; and a first input terminal of the second ANG gate is connected to the second output terminal of the second primary protection circuit, a second input terminal of the second AND gate is connected to the output terminal of the reverse connection protection circuit, and an output terminal of the second AND gate is connected to the gate of the fourth transistor.

7. The battery protection circuit according to claim 1, wherein the power supply circuit comprises a sixth resistor and a first capacitor, wherein a first terminal of the sixth resistor serves as the first terminal of the power supply circuit, a second terminal of the sixth resistor serves as the output terminal of the power supply circuit, the second terminal of the sixth resistor is connected to a first terminal of the first capacitor, and a second terminal of the first capacitor serves as the second terminal of the power supply circuit.

8. The battery protection circuit according to claim 6, wherein the battery protection circuit further comprises a seventh resistor, the first input terminal of the charge drive control circuit is connected to the second electrode through the seventh resistor.

9. A lithium battery system, comprising a charger, a battery and the battery protection circuit according to claim 1, wherein the battery comprises a cell, a first electrode and a second electrode; and a positive pole of the charger is connected to the first electrode, and a negative pole of the charger is connected to the second electrode.

* * * * *